United States Patent [19]

Van Kuik et al.

[11] 4,308,418
[45] Dec. 29, 1981

[54] ARRANGEMENT FOR HARD WIRING MOVABLE ROOM DIVIDER PANELS

[75] Inventors: Dirk J. Van Kuik, Jenison; Larry A. Speet, Holland, both of Mich.

[73] Assignee: Steelcase Inc., Grand Rapids, Mich.

[21] Appl. No.: 91,789

[22] Filed: Nov. 6, 1979

[51] Int. Cl.³ .............................................. H02G 3/28
[52] U.S. Cl. .................................... 174/48; 138/128; 174/101; 339/22 R
[58] Field of Search ....................... 174/48, 49, 69, 92, 174/101, 86, 68 C, 72 C, 70 C, 66, 95; 160/127, 135, 351; 52/173, 220, 221, 239; 339/22 R, 23; 138/128, 157–163; 220/241

[56] References Cited

U.S. PATENT DOCUMENTS

| | | | |
|---|---|---|---|
| 2,066,242 | 12/1936 | Abbott | 174/95 |
| 2,321,304 | 6/1943 | McNeil | |
| 2,790,653 | 4/1957 | Murphy | 174/72 C X |
| 3,529,389 | 9/1970 | Wilkins | 52/221 |
| 3,619,477 | 11/1971 | Rasmussen | 220/241 X |
| 3,841,042 | 10/1974 | Siegal | 52/738 X |
| 3,990,204 | 11/1976 | Haworth | |
| 4,017,137 | 4/1977 | Parks | |
| 4,020,604 | 5/1977 | Legler | |
| 4,060,294 | 11/1977 | Haworth et al. | 52/221 |
| 4,096,349 | 6/1978 | Donato | 174/48 X |
| 4,133,153 | 1/1979 | Hage | 52/220 |
| 4,135,775 | 1/1979 | Driscoll | 339/22 R |

Primary Examiner—Arthur T. Grimley
Assistant Examiner—D. A. Tone
Attorney, Agent, or Firm—Price, Heneveld, Huizenga & Cooper

[57] ABSTRACT

The specification discloses an arrangement for hard wiring movable room divider panels, comprising enclosed raceways adapted to mount electrical appliances therein, and being connected with and extending generally between the legs of the panels. A panel-to-panel wiring connector extends between and is attached to the ends of adjacent raceways, and includes a protective outer shell with a longitudinally extending interior cavity therethrough in which electrical wires are received. The wiring connector has a split body for longitudinally opening the outer shell, laying the wires in the interior cavity, and closing the outer shell about the wires, and includes opposed open ends which communicate with the adjacent raceways, whereby the raceways and channels form an uninterrupted shield for the wires, so as to economically hard wire the panels by hand without requiring a conventional conduit type of installation.

20 Claims, 16 Drawing Figures

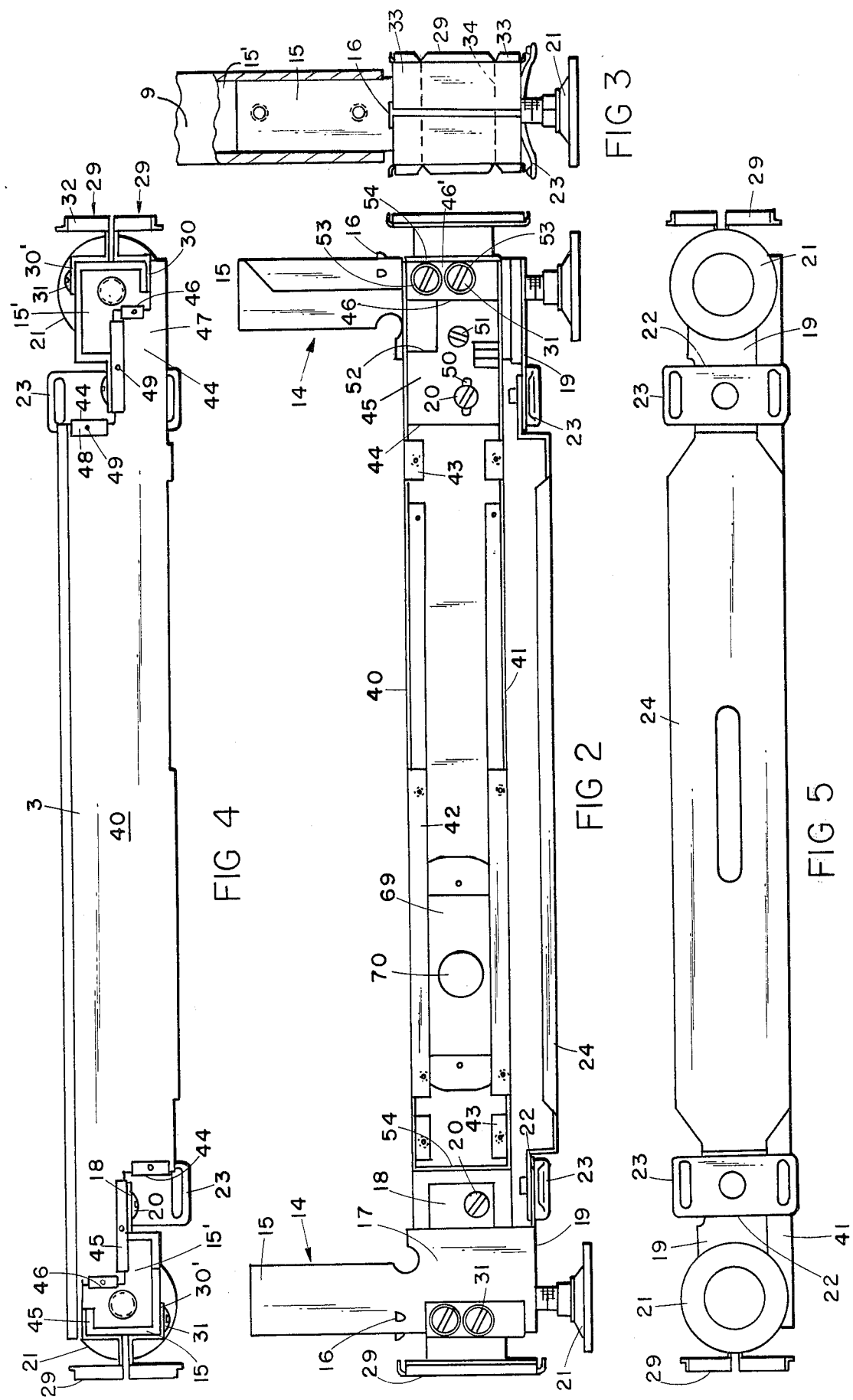

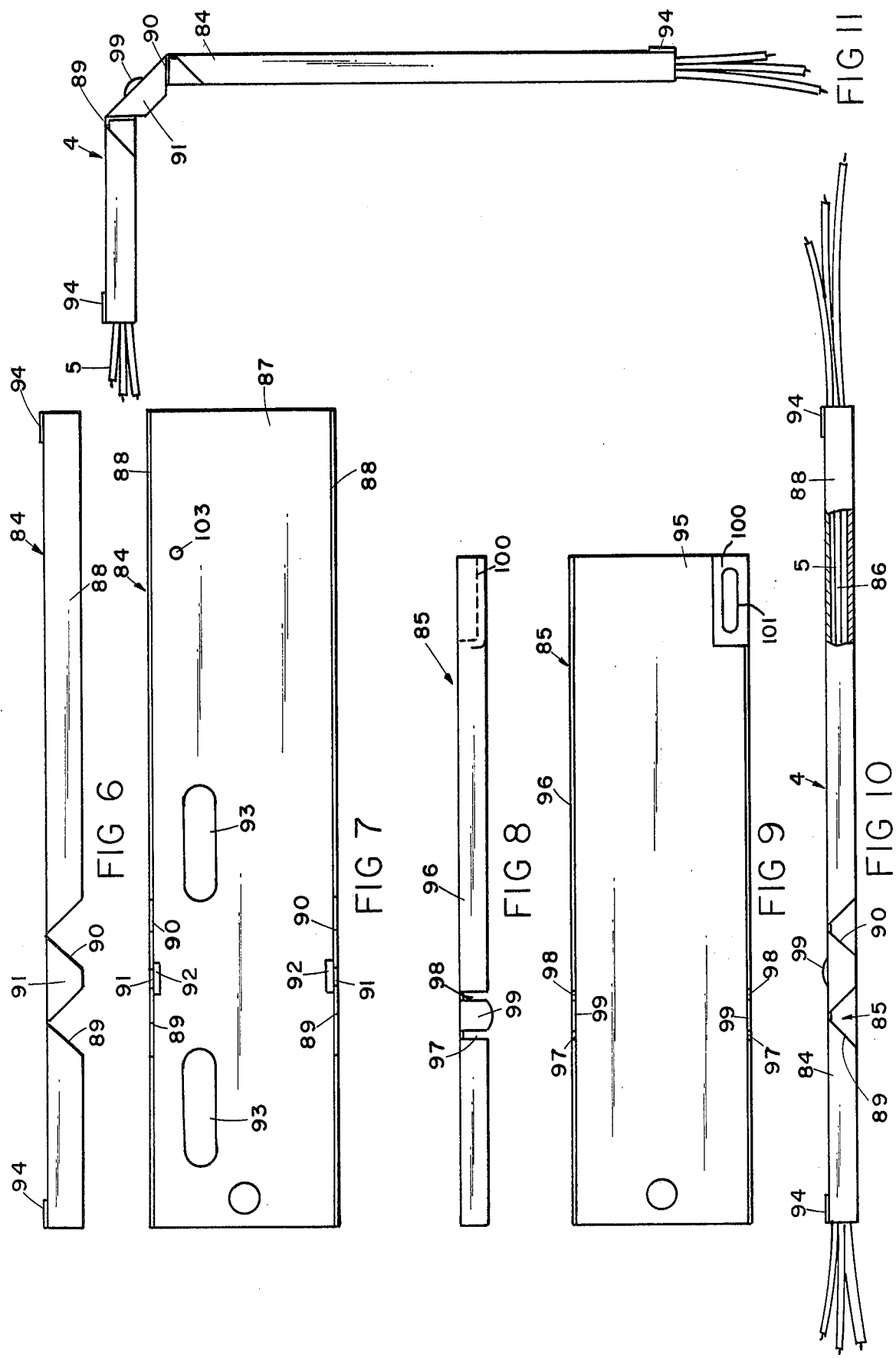

ARRANGEMENT FOR HARD WIRING MOVABLE ROOM DIVIDER PANELS

BACKGROUND OF THE INVENTION

The present invention relates to movable room divider panels, and in particular to a wiring arrangement therefor.

Freestanding, movable room divider panels are commonly used in offices and other areas to partition a large open space into a plurality of separate work stations. Because the panels are movable, they may be disassembled and rearranged to accommodate a wide variety of different working requirements.

One problem encountered with movable partition systems is the difficulty involved in economically and safely providing electricity to those work stations which require electrical power. Local building codes and utility inspectors typically do not permit users to run long length of electrical extension cords along the panels. Under such circumstances, the panels must be hard wired by hand, similar to conventional household wiring which is permanent, wherein flexible wires are threaded through the walls of the building and connected with switches, duplex outlets, and other electrical appliances and fixtures, by means of solder and tape joints, and/or solderless connectors with the joint located in an enclosed, rigid junction box. All exposed segments of the wire which extend along the outside of the building wall must be encased in a protective shield or conduit.

In movable partition systems, the wiring is preferably run continuous from one panel to the next. Even in those partition systems which include some type of wiring raceway attached thereto, the legs of the partition panels typically extend into or through the raceway, thereby destroying the protective integrity of the raceway for purposes of compliance with electrical code requirements. Further, that portion of the wiring which extends between adjacent panels must, under the above noted strict building codes, be fully shielded. Although both flexible and rigid conduit can be used with standard junction boxes to electrify the partition panels, it is very difficult to run the conduit through or along the panels in a neat, clean-cut manner without damaging the structural integrity of the panels. It is particularly difficult, if not impossible, to run fairly large conduit, such as one-half inch diameter conduit, through or around the vertical support posts and/or foot portions of freestanding partitions of the type having a supporting leg depending from the partition bottom edge at each end of the panel.

SUMMARY OF THE INVENTION

The present invention provides an arrangement for hard wiring movable room panels, comprising enclosed wireways connected with the panels, and panel-to-panel wiring connectors extending therebetween, thereby forming an uninterrupted shield for the wiring so as to hard wire the panels by hand without a conventional conduit type of installation. The connectors preferably have a body with a protective outer shell and a longitudinally extending interior cavity for receiving the wiring, and the connector body is split for longitudinally opening the protective outer shell, laying the wires therein without threading, and closing the outer shell about the wires.

Another aspect of the present invention is to provide a hard wiring arrangement wherein the connectors are deformable, and can be manually bent to match the angle between adjacent panels without disturbing the protective integrity of the connector. The connectors have opposed open ends communicating with the wireway, and the wireways are adapted to mount electrical receptacles therein.

Yet another aspect of the present invention is to provide a hard wiring arrangement wherein the wireways are selectively communicated with the vertical support posts of the panels to facilitate vertical wiring.

These and many other important advantages of the invention will be further understood and appreciated by those skilled in the art by reference to the following written specification, claims, and appended drawings.

BRIEF DESCRIPTION OF THE DRAWINGS

FIG. 2 is a front elevational view of a wiring raceway portion of the arrangement connected with panel legs, and with a front cover member of the raceway removed.

FIG. 3 is an end elevational view of the wiring raceway and attached panel legs, with a fragmentary portion of a vertical panel support post attached to one of the legs.

FIG. 4 is a top plan view of the wiring raceway and panel legs.

FIG. 5 is a bottom plan view of the wiring raceway and panel legs.

FIG. 6 is a top plan view of a rear half portion of a panel-to-panel connector of the arrangement.

FIG. 7 is a front elevational view of the connector rear half.

FIG. 8 is a bottom plan view of a front half portion of the connector.

FIG. 9 is an upside down, rear elevational view of the connector front half.

FIG. 10 is a top plan view of the connector, partially broken away and shown in an assembled, straight condition with wires extending therethrough.

FIG. 11 is a top plan view of the assembled connector bent into a right angle configuration.

DETAILED DESCRIPTION OF THE PREFERRED EMBODIMENTS

Figure 1:
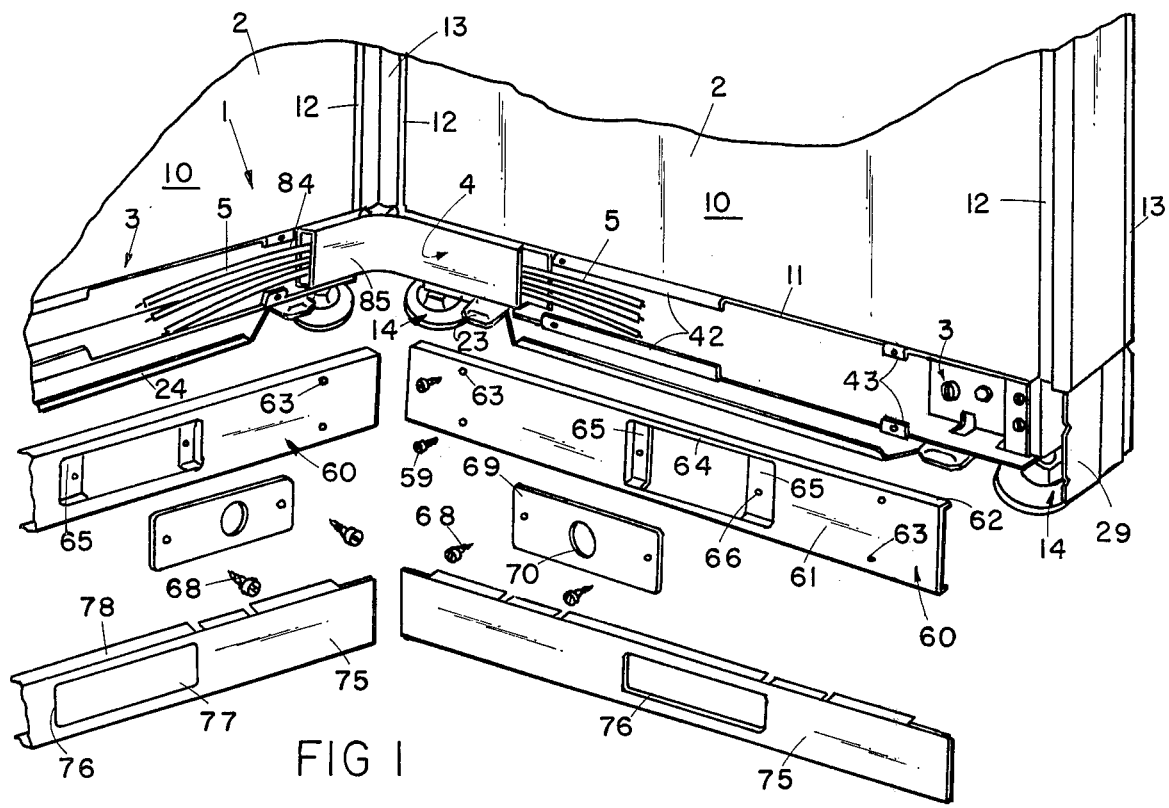
FIG. 1 is a fragmentary, exploded perspective view of a removable room divider system and a hard wiring arrangement therefor embodying the present invention.
Figure 13:
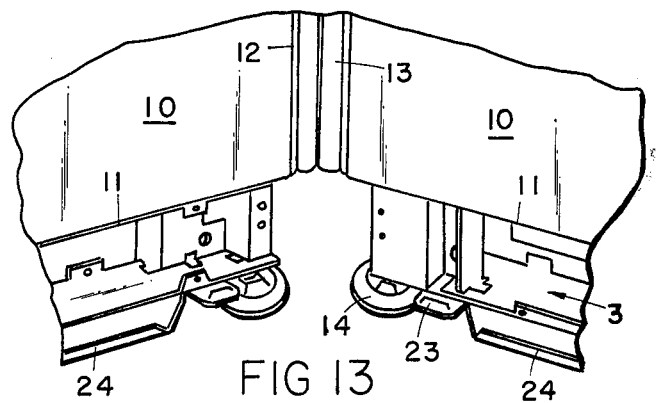
FIG. 13 is a fragmentary perspective view of the wiring arrangement with end walls of adjacent raceways removed to install a connector therein.
Figure 14:
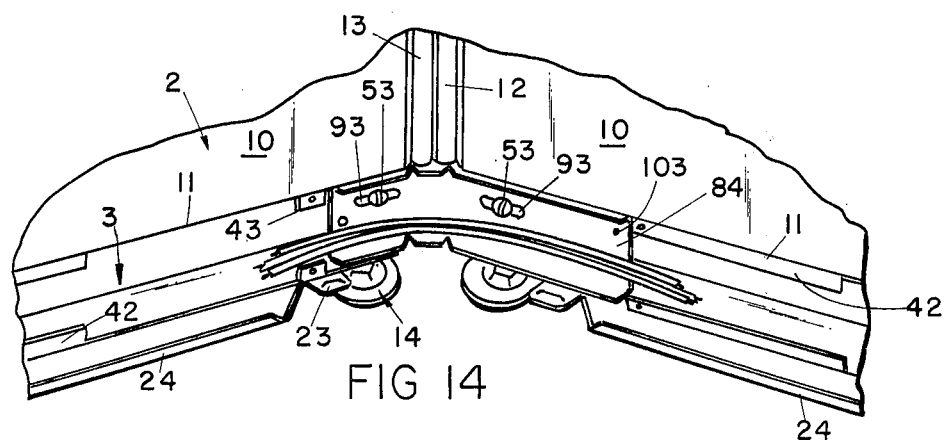
FIG. 14 is a fragmentary perspective view of the wiring arrangement with the connector rear half mounted in the adjacent panels.

For purposes of description herein, the terms "upper", "lower", "right", "left", "front", "vertical", "horizontal", and derivatives thereof shall relate to the invention as oriented in FIG. 1. However, it is to be understood that the invention may assume various alternative orientations, except where expressly specified to the contrary.

The reference numeral 1 generally designates an arrangement for hard wiring movable room divider panels 2, and includes wiring raceways 3 connected with room divider panels 2, with the free ends of the raceways disposed in an adjacent, end-to-end relationship with the panels are assembled, with a slight gap formed between the raceway ends. A panel-to-panel wiring connector 4 extends between the ends of adjacent raceways 3 spanning the gap, and comprises a protective outer shell with a longitudinally extending interior cavity therethrough communicating the raceways, and shaped to receive wires 5 therein, thereby providing a continuous protective enclosure for the wires.

The present wiring arrangement may be used in conjunction with a wide variety of different types of room divider panels, and in this example, as best illustrated in FIGS. 1–4, the panels 2 are of a conventional design, and include a central panel member 10 having a lower edge 11 and side edges 12 with trim members 13 connected therewith. Each panel 10 is supported by a pair of legs 14 which depend from the center of the panel lower edge 11 at each end of the panel. The legs 14 are preferably vertically adjustable, and support the panels 2 a spaced apart distance from the floor, such that wiring raceways 3 may be positioned between the panel lower edge 11 and the supporting floor surface.

The panel legs 14 (FIGS. 2–5) include an upper, channel-shaped member 15 which is telescopically received in a mating portion of the panel and interconnects the same. The leg channels 15 are preferably received in hollow, vertical support columns 9 disposed in the panels 2, such that an aperture or passageway 15' is formed along each side of the panels. Detents 16 extend outwardly of the channel surfaces and provide a stop which abuts the lower edge of the panel 10 and insures that the panel lower edge 11 is spaced apart a predetermined distance from the supporting floor. The panel legs 14 also include a body portion 17, having a flange 18 projecting inwardly along the longitudinal centerline of raceway 3, and a base 19. The leg flange 18 includes an aperture therethrough which is adapted to receive a fastener 20 therein to connect the wiring raceway 3 to the panel legs 14. The leg base 19 includes an adjustable foot or glide 21 threadedly mounted therein for varying the vertical position of each end of the panels 2 in infinitely small increments. A tab portion 22 of leg base 19 extends inwardly, and is connected with and supports a clip 23 and tray 24 arrangement which is shaped to receive and retain a communications cable therein, as described hereinafter in greater detail.

The wiring arrangement 1 also includes end caps 29 (FIGS. 2–5) to cover the ends of the space formed between the panel lower edge 11 and the supporting floor at each exposed, outer end of the partition system. The end caps 29 comprise a bracket 30 having one end 30' thereof connected with the leg 14 by fasteners 31. The bracket 30 extends inwardly to a medial portion of the side edge 12 of the panel, and thence extends outwardly therefrom to an enlarged cover 32. One end cap 29 is connected to each side of the panel legs 14, such that the two covers 32 mate to form a closure having a height and width sufficient to cover the space at the end of the partition between the lower edge 11 of the panel and the floor. That portion 33 of the cover 32 which extends upwardly and downwardly of the bracket 30 is separated from the remainder of the cover by a groove or score line 34 along which cap portion 33 may be severed to facilitate installing communications lines in the tray 24 underneath the wiring raceway 3, as described in greater detail hereinafter.

The wiring raceways 3 are adapted to extend along the length of the panels 2 and form a protective enclosure for the wires 5 in a manner complying with general electrical building code requirements. In this example, the raceways 3 are elongate boxes having a substantially rectangular shape, as best illustrated in FIGS. 1, 2 and 4. The raceways comprise upper and lower walls 40 and 41 respectively, with inwardly turned flange segments 42 and 43 along both side edges thereof. The upper and lower walls 40 and 41 are interconnected in a spaced apart relationship by fixed side walls 44–46 (FIGS. 2 and 4) positioned at each end of the raceway and forming an offset portion 47 thereof which is shaped to facilitate connecting the associated panel leg 14 therewith. The illustrated side walls 44–46 comprise generally U-shaped members with upper and lower flanges 48 thereof overlying the exterior surfaces of the upper and lower walls 40 and 41, and are connected thereto by means such as spot welds 49. The fixed side walls 44–46 are arranged in a mutually perpendicular fashion, or stepped pattern, so as to form a generally L-shaped aperture in which the panel leg 14 is positioned. Fixed side wall 45 includes an elongated slot 50 through which fastener 20 extends and attaches raceway 3 to leg flange 18, as well as electrical ground fastener 51, and an aperture 52 which is adapted to communicate the wiring raceway 3 with the interior 15' of the panel leg 10 and the vertical support post portion 9 of the panel. The outer fixed wall 46 is L-shaped, with the outer leg 46' thereof abutting the panel leg 14, and including a pair of spaced apart apertures 53 therein which are aligned with and receive fasteners 31 therein to avoid interference therebetween. The raceways 3 include end walls 54 connected with leg 46' on the right-hand side of the raceway and fixed wall 44 on the left-hand side along a groove or score line, such that the end wall may be detached from the raceway to permit adjacent wiring raceways to be electrically interconnected. When the right-hand end wall 54 is removed from the raceway, the leg 46' and associated portions of the upper and lower wall 40 and 41 form a shallow U-shaped channel in which the connector 4 is adapted to be telescopically received. When the left-hand end wall 54 is removed from the raceway, connector 4 may be inserted between those portions of the upper and lower walls 40 and 41 disposed between the flange 42 and the outer edge of the fixed side wall 44.

Figure 12:
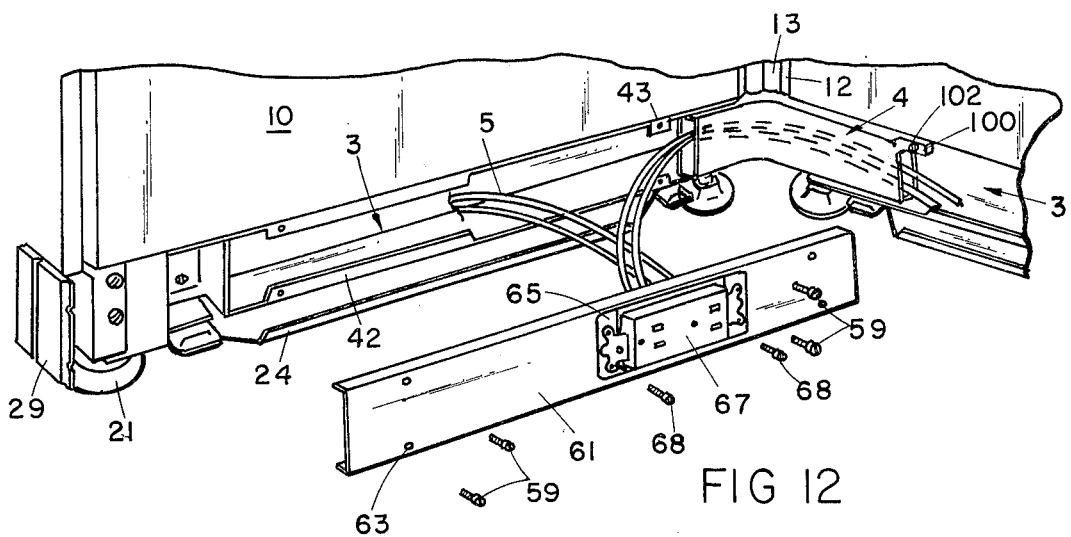
FIG. 12 is a fragmentary, exploded perspective view of the hard wiring arrangement, particularly showing a receptacle connected in a mounting cover portion of the wiring raceway.

A mounting plate and wireway cover 60 (FIG. 1) is connected along both sides of the wiring raceway 3 to close the opening between the upper and lower walls 40 and 41, and to interconnect the upper and lower walls. In this example, the cover 60 is a channel-shaped structure having a flat face 61 and inwardly extending flanges 62 which are adapted to overlie the exterior surface of the upper and lower walls 40 and 41 so as to form a secure closure for the raceway. The plate face 61 also includes a plurality of fastener apertures 63 therethrough which are aligned and mate with threaded apertures in the upper and lower flange members 42 and 43, and are adapted to receive threaded fasteners 59 therethrough to connect cover 60 with the upper and lower raceway walls 40 and 41. The cover 60 also includes an electrical appliance aperture 64 therethrough having recessed end walls 65 with a fastener aperture 66 therein. The appliance aperture and wall arrangement 64 and 65 are shaped to mount a standard electrical receptacle 67 (FIG. 12) therein with fasteners 68 threadedly connected in mating cover apertures 66. When an electrical receptacle is not required at a particular location, a closure or cover plate 69 is connected with and extends between the recessed end walls 65 by fasteners 68, thereby closing the receptacle opening. The cover plate 69 preferably includes a circularly shaped knockout plug 70 positioned centrally therein for purposes to be described hereinafter.

A base trim plate 75 is provided for each of the raceways to cover the space between the lower edge of the panel 2 and the supporting floor surface, thereby covering the raceways 3 and communication wire retainers 24, such that all of the wiring is concealed. The trim plate 75 includes an aperture 76 therein which is aligned and shaped to mate with the electrical receptacle 67, and permits the exterior face of the receptacle to extend therethrough. An access cover 77 is connected in the trim plate aperture 76 in the event that the associated wireway is not provided with an electrical outlet or other utility. The exterior surface of the cover plate is otherwise continuous, and a plurality of tabs 78 extend along the upper and lower edges thereof to form a snap lock engagement with the wiring raceway 3 to retain the same in place.

As best illustrated in FIGS. 2 and 4, the raceway 3 has a symmetrical shape, with oppositely oriented offset portions 47, and identical upper and lower halves. In this manner, a single raceway design may be used in a wide variety of different configurations, and may be installed from either side of the panel system.

The panel-to-panel wiring connector 4 has a split body construction with means for longitudinally opening the protective outer shell, laying the wires 5 into the interior cavity of the connector body, and closing the outer shell about the wires. As best illustrated in FIGS. 6–11, connector 4 comprises two U-shaped channel members 84 and 85 which are nested together to form a cavity 6 therebetween in which the wires 5 are received. The first channel member 84 is preferably positioned furthest away from the inside surface of panel 2, and comprises a U-shaped channel with a central web 87 and flanges 88 extending from opposing side edges thereof. The webs 88 are spaced apart a distance substantially commensurate with the distance between the inside surfaces of upper and lower raceway walls 40 and 41, such that the same may be telescopingly inserted therebetween. Two pairs of V-shaped notches 89 and 90 are provided in the upper and lower flanges 88, and are spaced apart a distance sufficient to form a pair of trapezoidally shaped ears 91 therebetween. A pair of apertures 92 are provided in the web 87 adjacent opposing side edges thereof, and are centered at the base of the trapezoidal ears 91. A pair of aligned, spaced apart, elongated slots 93 are positioned in the web at a location in alignment with the upper fastener 53 (FIG. 2) which connects the end caps 29 to the leg 14. The web also includes ends 94 which are bent backwardly and doubled over to from a smooth terminal edge.

The second channel member 85 is preferably located nearest the inside surface of the panel system, and includes a U-shaped channel having a web 95 and opposing flanges 96 which are spaced apart a distance substantially commensurate with the distance between the inside surfaces of the outside channel flanges 88, such that the same are matingly received therein. The interior channel flanges 96 have a width slightly thinner than that of the outside channel flanges 88, such that when the channel members 84 and 85 are interconnected, the outside channel member flanges 88 and the web 95 of the inside channel are substantially flush. The inside channel flanges 96 include two pairs of apertures 97 and 98 therethrough which are vertically aligned, and spaced apart a distance sufficient to form a tab 99 therebetween. A connector tongue 100 is formed in web 95 and bent inwardly flush with the free edge of flanges 96 to connect the two connector members 84 and 85. The connector tongue includes a slot 101 shaped to receive therein a fastener 102 (FIG. 12) which in turn is threaded through a mating aperture 103 (FIG. 7) in outside channel web 87.

As best illustrated in FIG. 10, the outside and inside channel members 84 and 85 are interconnected by inserting the inside channel 85, with flange 96 first, inbetween the flanges 88 of outside channel 84. The channel members 84 and 85 are longitudinally aligned until such time as the terminal edge of the tabs 99 protrude through mating apertures 92, thereby locking or keying the two channel members in place. In this position, the trapezoidally shaped ears 91 overlie the tabs 99 and cover the interior flange apertures 97 and 98, such that the connector forms a substantially imperforate shield about the wires.

The channel members 84 and 85 are preferably constructed of a suitable material such that wiring connector 4 is inelastically deformable, and may be manually bent into an angular relationship which is commensurate with the angular relationship between the adjacent room divider panel which the connector is intended to bridge. The illustrated channel members 84 and 85 are constructed of a rather low carbon steel, in the nature of 20 gauge cold rolled steel, and may be manually bent in the assembled position, as illustrated in FIGS. 10 and 11, as a result of the V-notch and aperture arrangement 89–90 and 97–98 in the associated channel flanges. When connector 4 is bent, outside channel 84 bends at two places, along a pair of parallel lines extending between each pair of V-notches 89 and 90. In this example, each of the V-notches 89 and 90 is in the nature of 90°, such that the connector may be formed into an angle of greater than 90°. The inside channel 85 bends in a similar manner along two lines extending between the associated apertures 97 and 98. Because the outer edge of the trapezoidally shaped ear 91 is substantially equal in width to that of the tabs 99, in this example approximately ¼ inch, and the apertures are relatively narrow, in the nature of ⅛ inch, the connector remains substantially imperforate even when the same is bent into a wide variety of different angular configurations.

Figure 15:
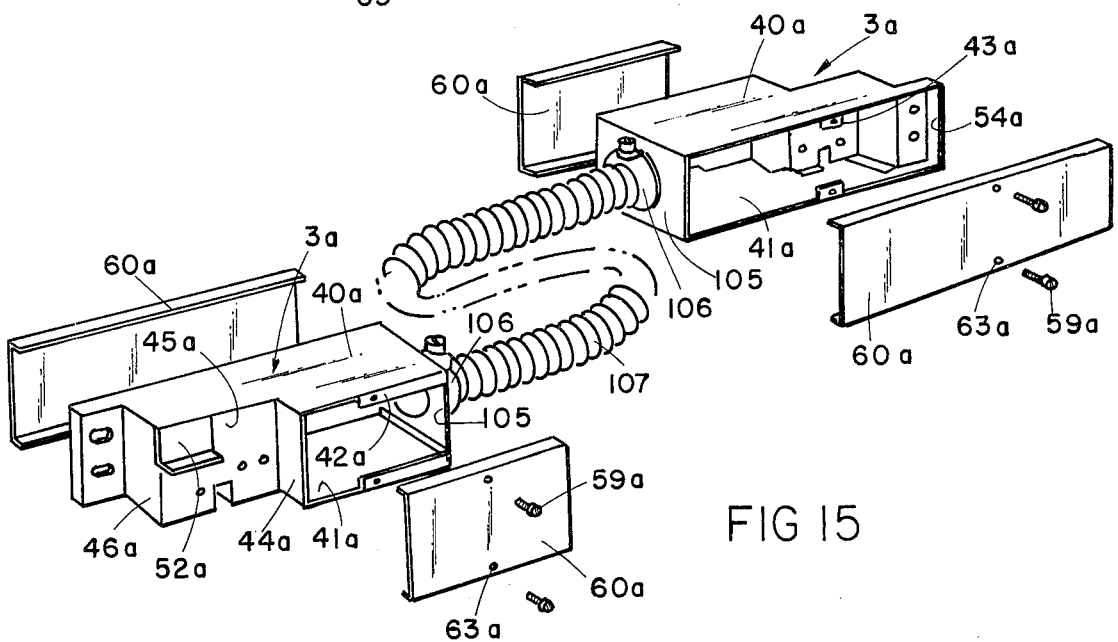
FIG. 15 is another embodiment of the present invention adapted for hard wiring curved panels.

The reference numeral 1a generally designates another embodiment of the present invention (FIG. 15), wherein the wiring raceway includes a flexible midportion to facilitate wiring curved panels, such as those used to form rounded 90° corners. Since the wiring raceway is otherwise substantially the same as the previously described device, similar parts appearing in FIGS. 1–14 and 15 respectively are represented by the same, corresponding reference numeral, except for the suffix "a" in the numerals of the latter. The wiring raceway 3 is truncated at a convenient, predetermined location from each end of the same, and is closed by an end wall 105. Each end wall 105 includes an adapter 106 which attaches the free end of a flexible conduit 107 therewith, such that the conduit communicates each end of the wiring raceway 3. The wireway covers 60a are correspondingly shortened to mate with the associated raceway end.

In use, wiring raceways 3 and end caps 29 are preferably installed in new room partition panels at the factory. The panels 2 are set into the desired configuration in the room to be partitioned, and are mechanically interconnected. To provide electrical wiring to selected work stations formed by the partitions, an electrician removes one or both of the trim panels 75 from each of the panels to be wired, as well as from those panels disposed between the same and the source of power through which wiring must be run. The trim panels 75 are removed by pulling outwardly at the bottom of the panels at extreme ends thereof in the area of the feet or glides 21. The end caps 29 on those panels to be wired, or have wire installed therein, are then removed from the associated panel legs 14 by removing fasteners 31, and the cover plates 60 of each of the effected panels are also removed by loosening fasteners 59. If those partitions which are to be wired do not include a wiring raceway, such as existing, previously arranged panels, a wiring raceway 3 is positioned between the legs of the panel and attached thereto by fasteners 20. The symmetrical shape of the raceways 3 permits the same to be installed from either side of the panel without disassembling the other raceway side. The electrician may then wire the raceways by using a wide variety of different techniques according to the particular circumstances and his personal perference. In any event, conventional 12-2 or 14-2 wire with ground is used, in conjunction with standard 110V AC duplex outlets, switches, and the like. One method for wiring the panels comprises laying the electrical wires 45 loosely around the base of those panels to be wired, as specified by the electrical wiring layout. The receptacles 67 are then wired and mounted beginning with those closest to the source of electrical power. At those positions wherein the wire extends from one panel to the next, a connector 4 is provided to shield the wire. The electrician initially severs the adjacent raceway end walls 54 along the associated groove by means such as fatiguing the end off with a side-to-side bending motion. The electrician then selects a pair of inside and outside channel members 84 and 85, aligns the same by inserting the tabs 99 into the corresponding aperutres 92, and then manually bends the channels into an angular relationship which corresponds to that of the adjacently positioned partitions which the connector is to bridge. If the panels are straight, the connector is not bent. If the panels intersect at a 90° corner, the connector is bent into a right angle, as illustrated in FIG. 11. The outside channel 84 is next inserted between the upper and lower walls 40 and 41 of the raceway, such that they fit snugly therein in nested fashion, and fasteners 53 are inserted through connector slots 93 and are engaged in legs 14, thereby securely attaching each leg of the connector to the panels. Preferably, fasteners 53 are conductive so as to establish an electrical ground between the wireways 3. The wires 5 are then shaped to conform to the angle of the outside channel 84 and laid therein, and the inside channel 85 is then placed thereover, with tabs 99 located in apertures 92, and connected with the outside channel 84 by fastener 102, such that the wires are safely received in and shielded by the connector. Fastener 102 is also preferably conductive to insure a continuous electrical ground through the wiring raceways 3.

Receptacles 67 are installed in the raceways 3 by drawing a loop or free end of the wire through the cover aperture 64, preferably while the cover 60 is diassembled from the raceway. The wires 5 are then prepared in a conventional fashion by stripping the insulation from the free ends, and connecting the same with the receptacle 67. The ground wire is connected with fasteners 51 to insure proper electrical grounding for the panel system. The receptacle 67 is connected with cover 60 by fastener 68, and wireway cover 60 is in turn connected with the wiring raceway 3 by fasteners 59, such that the wiring raceways 3 in combination with the connectors 4 form a continuous shield for the wiring 5.

If a power inlet is to be installed in the wiring raceway 3, knock-out plug 70 is removed from receptacle cover plate 69, and an appropriate socket is physically connected therewith, and the wires are run through the raceway. The cover plate is then reconnected with the wireway cover 60.

In the event that wires 5 are to be directed to the ceiling or floor, the wires are threaded through raceway aperture 52 at a selected end of the raceway, and directed upwardly or downwardly through vertical passageway 15'.

Figure 16:
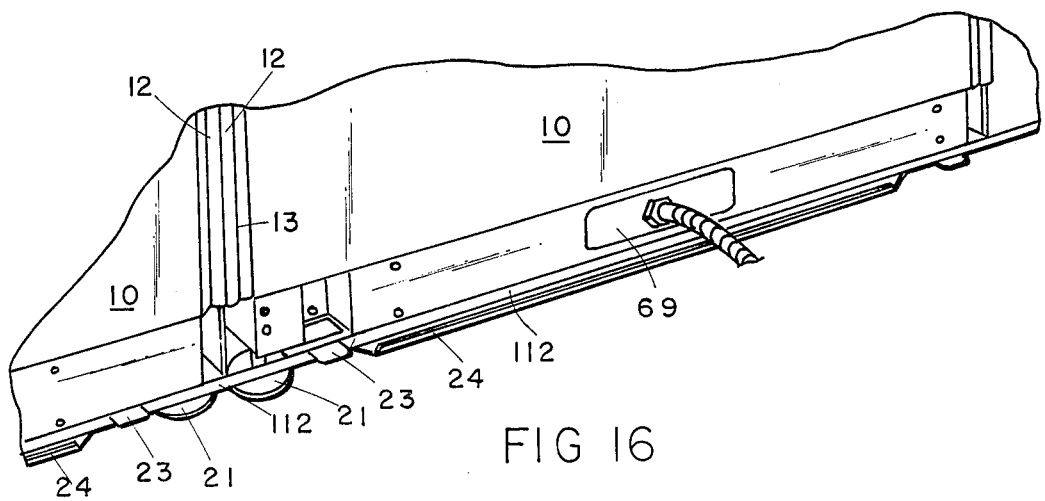
FIG. 16 is a fragmentary perspective view of the wiring arrangement, particularly showing a communications wire laid in position.

As best illustrated in FIG. 16, communications lines 112, such as intercom and telephone wires, are connected with the panels 2 in a manner which completely isolates them from the electrical wires 5, as is required by strict building codes. At those areas in which the end caps 29 have not been removed, the lower portion 33 of the cap is severd therefrom along groove 34 to form an aperture into which the communication line can be inserted. The line 112 is directed between clip 23 and the upper surface of the tray 24, and is supported along its medial portion on tray 24. Those end caps 29 which are required at the exposed, free ends of the panels may then be replaced.

After both the electrical wires 5 and communication lines 112 are installed in the panels, the base trim panels 75 are then snapped onto the wiring raceways. At those locations in which a receptacle or power inlet is located, the plug member 77 is removed, such that the electrical appliance may extend therethrough for easy access.

The split body construction of the connectors 4, in conjunction with the wiring raceways 3 provide an arrangement for efficiently hard wiring the panel system without pre-wired, flexible conduit connectors and/or a conventional conduit type of installation. Because the connectors 4 are manually bendable and have an uncomplicated design, the panels may be completely wired with the use of just a few, simple hand tools, such as pliers and screwdrivers.

In the foregoing description, it will be readily appreciated by those skilled in the art that many modifications may be made to the invention without departing form the concepts disclosed herein. Such modifications are to be considered as included in the following claims unless these claims by their language expressly state otherwise.

The embodiments of the invention in which an exclusive property or privilege is claimed are defined as follows.

1. In a panel system for partitioning a room, including at least two movable room divider panels, the improvement comprising:

a pair of wiring raceways connected with said room divider panels, and having ends thereof disposed in an adjacent, end-to-end relationship when said panels are assembled; and a panel-to-panel wiring connector extending between adjacent ends of said raceways, and comprising an elongate body with a protective outer shell and a longitudinally extending interior cavity therethrough shaped for receiving electrical wires therein; said protective outer shell being made of a substantially inelastic material; said connector body having a split construction which permits opening the protective outer shell, laying the wires into the interior cavity of said connector body, and closing the outer shell about the wires, and including opposed open ends received in and communicating with said wiring raceways, thereby forming a secure enclosure for shielding the wires for hard wiring said panel system; said connector being deformable for manually bending the same into an angular relationship commensurate with the angular relationship between adjacent room divider panels.

2. A panel system as set forth in claim 1, wherein:
a slight gap is formed between said raceway ends; and
said panel-to-panel wiring connector spans said gap between the ends of said raceways.

3. A panel system as set forth in claim 2, wherein:
said connector body comprises first and second U-shaped members which telescopically interconnect to form therebetween said cavity.

4. A panel system as set forth in claim 3, wherein:
said connector body members each include a center web, and a pair of opposing flanges disposed in the plane of bending; each pair of opposing flanges including a pair of apertures therethrough, which are aligned to direct the bending of each said web along a predetermined line.

5. A panel system as set forth in claim 3, wherein:
said first and second U-shaped connector body members are connected on an interior side of said panel system, and each includes a central web with a pair of flanges disposed in the plane of bending;
said first U-shaped body member flanges include two pairs of V-shaped notches spaced apart along the length of the connector body at a medial portion thereof; each notch pair being aligned to direct web bending along a pair of predetermined lines;
said second U-shaped body member flanges include two pairs of apertures spaced apart along the length of the connector body at a medial portion thereof, and forming a pair of tabs therebetween;
said first U-shaped body member web includes an aperture disposed at each side edge thereof disposed between each pair of V-shaped notches, and shaped to receive said tabs therein to align said first and second connector body members.

6. A panel system as set forth in claim 1, wherein:
said connector body comprises first and second U-shaped members which telescopically interconnect to form said body, and define said cavity between said U-shaped members.

7. A panel system as set forth in claim 6, wherein:
said connector body members each include a center web, and a pair of opposing flanges disposed in the plane of bending; each pair of opposing flanges including a pair of apertures therethrough, which are aligned to direct the bending of said web along a predetermined line.

8. A panel system as set forth in claim 6, wherein:
said first and second U-shaped connector body members are connected on an interior side of said panel system, and each includes a central web with a pair of flanges disposed in the plane of bending;
said first U-shaped body member flanges include two pairs of V-shaped notches spaced apart along the length of the connector body at a medial portion thereof; each notch pair being aligned to direct web bending along a pair of predetermined lines;
said second U-shaped body member flanges include two pairs of apertures spaced apart along the length of the connector body at a medial portion thereof, and forming a pair of tabs therebetween;
said first U-shaped body member web includes an aperture disposed at each side edge thereof disposed between each pair of V-shaped notches, and shaped to receive said tabs therein to align said first and second connector body members.

9. A panel system as set forth in claim 8, wherein:
said second U-shaped body member is disposed between the flanges of said first U-shaped body member; and
said V-shaped notches in the flanges of said first U-shaped body member are spaced apart a distance sufficient to form a trapezoidal ear which overlies and covers the apertures in the flanges of said second U-shaped body member, whereby said connector outer shell is substantially imperforate and remains so when bent into a wide variety of different angular configurations.

10. A panel system as set forth in claim 1, wherein:
said wiring raceways extend along a lower edge of said room divider panels and are connected with a pair of spaced apart panel legs depending therefrom.

11. A panel system as set forth in claim 1, wherein:
said wiring raceways are shaped to isolate the electrical wires, and include removable end caps which are severed from said raceway to provide an aperture adapted to telescopingly receive one end of said connector therein, whereby said wireways and said connector form a continuous shield for the wires.

12. A panel system as set forth in claim 11, wherein:
said room divider panels include hollow, vertically disposed support columns; and
said wiring raceways communicate with associated support columns to facilitate vertical wiring.

13. A panel system as set forth in claim 1, wherein:
said raceways each include a removable closure having means for mounting electrical outlets therein.

14. A panel system as set forth in claim 13, wherein:
said removable closure includes an aperture therethrough shaped to mount an electrical outlet therein; and including
a cover plate adapted to selectively close said closure aperture and having a knock-out plug to facilitate mounting a building power distribution source.

15. An arrangement for electrically interconnecting at least two movable room divider panels, comprising:
at least two wireways adapted for connection with a different one of said panels along a free edge thereof; said wireways including means for enclosing electrical wiring in the wireway; and a panel-to-panel wiring connector extending between and connected with said wireways, and including an elongate body with a protective outer shell and a longitudinally extending interior cavity therethrough shaped for receiving the wiring therein; said protective outer shell being made of a substantially inelastic material; said connector body having a split construction which permits opening the protective outer shell, laying the wiring in said interior cavity, and closing the outer shell about the wiring, and including open ends communicating with said wireways, whereby said wiring connector is adapted to form a shield about the wiring for hard wiring the room divider panels; said connector being deformable for manually bending the same into an angular relationship commensurate with the angular relationship between said wireways.

16. A panel-to-panel wiring connector for electrically interconnecting two movable room divider panels of the type having isolated electrical wiring raceways disposed adjacently in an end-to-end relationship when the panels are assembled, said connector comprising:

an elongate body adapted for extending between the room divider panels, and having a protective outer shell, and a longitudinally extending interior cavity therethrough shaped for receiving electrical wires therein; said connector body having a split construction which permits said protective outer shell being made of a substantially inelastic material; opening said protective outer shell, laying the wires in said interior cavity, and closing said protective outer shell about the wires; said connector body further having opposing legs for connection with an associated one of the room divider panels, and including open ends for communicating with the wiring raceways of said adjacent panels thereby forming a secure enclosure for shielding the wires for hard wiring the same; said connector body being deformable for manually bending the same into an angular relationship commensurate with the angular relationship between adjacent room divider panels.

17. A connector as set forth in claim 16, wherein:
said connector body comprises first and second U-shaped members which telescopically interconnect to form said body and define said cavity between said U-shaped members.

18. A connector as set forth in claim 17, wherein:
said connector body members each include a center web, and a pair of opposing flanges disposed in the plane of bending; each pair of opposing flanges including a pair of apertures therethrough, which are aligned to direct the bending of each said web along a predetermined line.

19. A connector as set forth in claim 17, wherein:
said first and second U-shaped connector body members each includes a central web with a pair of flanges disposed in the plane of bending;
said first U-shaped body member flanges include two pairs of V-shaped notches spaced apart along the length of the connector body at a medial portion thereof; each notch pair being aligned to direct web bending along a pair of predetermined lines;
said second U-shaped body member flanges include two pairs of apertures spaced apart along the length of the connector body at a medial portion thereof, and forming a pair of tabs therebetween;
said first U-shaped body member web includes an aperture disposed at each side edge thereof disposed between each pair of V-shaped notches, and shaped to receive said tabs therein to align said first and second connector body members.

20. A connector as set forth in claim 19, wherein:
said second U-shaped body member is disposed between the flanges of said first U-shaped body member; and
said V-shaped notches in the flanges of said first U-shaped body member are spaced apart a distance sufficient to form a trapezoidal ear which overlies and covers the apertures in the flanges of said second U-shaped body member, whereby said connector outer shell is substantially imperforate and remains so when bent into a wide variety of different angular configurations.

* * * * *

UNITED STATES PATENT AND TRADEMARK OFFICE
CERTIFICATE OF CORRECTION

PATENT NO. : 4,308,418
DATED : December 29, 1981
INVENTOR(S) : Dirk J. Van Kuik, et al.

It is certified that error appears in the above—identified patent and that said Letters Patent is hereby corrected as shown below:

Column 5, line 62:

"from" should be --form--

Column 6, lines 19 & 20:

"inbetween" should be --in between--

Column 7, line 35:

"45" should be --5--

Column 7, line 47:

"aperutres" should be --apertures--

Column 8, line 8:

"fasteners" should be --fastener--

Column 8, line 59:

"form" should be --from--

UNITED STATES PATENT AND TRADEMARK OFFICE
CERTIFICATE OF CORRECTION

PATENT NO. : 4,308,418
DATED : December 29, 1981
INVENTOR(S) : Dirk J. Van Kuik, et al.

It is certified that error appears in the above—identified patent and that said Letters Patent is hereby corrected as shown below:

Column 11, line 28:

Before "said" insert --said protective outer shell being made of a substantially inelastic material;--

Column 11, line 29:

After "which permits" delete --said protective outer shell being made of a substantially inelastic material;--

Signed and Sealed this

First Day of June 1982

[SEAL]

Attest:

Attesting Officer

GERALD J. MOSSINGHOFF

Commissioner of Patents and Trademarks